US008131610B2

(12) United States Patent
Soumokil (10) Patent No.: US 8,131,610 B2
(45) Date of Patent: Mar. 6, 2012

(54) METHOD AND SOFTWARE APPLICATION FOR COMPUTER AIDED CUSTOMER INDEPENDENT CASH COLLECTION USING A STATE FIELD IN A DATA RECORD

(75) Inventor: Mike Soumokil, Rosmalen (NL)

(73) Assignee: SAP AG, Walldorf (DE)

( * ) Notice: Subject to any disclaimer, the term of this patent is extended or adjusted under 35 U.S.C. 154(b) by 619 days.

(21) Appl. No.: 10/573,024

(22) PCT Filed: Nov. 2, 2004

(86) PCT No.: PCT/EP2004/052750
§ 371 (c)(1),
(2), (4) Date: Aug. 12, 2008

(87) PCT Pub. No.: WO2005/043426
PCT Pub. Date: May 12, 2005

(65) Prior Publication Data
US 2009/0043679 A1 Feb. 12, 2009

(30) Foreign Application Priority Data
Oct. 31, 2003 (EP) .................................... 03024847

(51) Int. Cl.
*G07F 19/00* (2006.01)
(52) U.S. Cl. ..................... 705/34; 705/1; 705/8; 705/14; 705/26; 705/28; 705/35; 705/36; 705/38; 705/39; 705/40; 705/42; 717/100; 717/101; 717/120; 717/144; 717/162; 717/163
(58) Field of Classification Search ...................... 705/34
See application file for complete search history.

(56) References Cited

U.S. PATENT DOCUMENTS

| 6,718,535 | B1 * | 4/2004 | Underwood | 717/101 |
| 6,989,820 | B1 * | 1/2006 | Baker et al. | 345/172 |
| 7,254,558 | B2 * | 8/2007 | Hinkle et al. | 705/40 |
| 2003/0130937 | A1 * | 7/2003 | Reynolds | 705/39 |
| 2007/0130066 | A1 | 6/2007 | Soumokil | |

FOREIGN PATENT DOCUMENTS

| EP | 1164519 A2 | 12/2001 |
| WO | WO 2005/043427 A1 | 5/2005 |

OTHER PUBLICATIONS

Hurt, Suzanne. Why automate payables and receivables? Strategic Finance, v84n10, p. 33-35, Apr. 2003 (includes Illustration).*
Bruce Hallberg et al., Special Edition, Using Microsoft Excel 97, Best Seller Edition, Oct. 1997 (Excel 97), 2 pages.
Financial Administration Collections and Write Offs (F39), Revised Jun. 19, 1998, 3 pages.
Financial Administration Collections and Write Offs (F39), Revised Aug. 24, 2009, 3 pages.

* cited by examiner

*Primary Examiner* — F. Zeender
*Assistant Examiner* — Fawaad Haider
(74) *Attorney, Agent, or Firm* — Finnegan, Henderson, Farabow, Garrett & Dunner, LLP (57) ABSTRACT

Systems and methods are provided for computerized processing of invoices which a company has presented to, for example, two or more customers. The systems and methods may be configured to select, from a plurality of invoices, invoices which are due within a preselectable time or on a preselectable date and the balance of which is larger than a preselectable first value, and to assign a first state to the selected invoices.

22 Claims, 7 Drawing Sheets

METHOD AND SOFTWARE APPLICATION FOR COMPUTER AIDED CUSTOMER INDEPENDENT CASH COLLECTION USING A STATE FIELD IN A DATA RECORD

This application is a national stage filing under 35 U.S.C. §371 of International Application No. PCT/EP2004/052750, filed Nov. 2, 2004, which claims priority to EP 03024847.0, filed Oct. 31, 2003. The contents of these applications are expressly incorporated herein by reference to their entireties.

FIELD OF THE INVENTION

The technical field of this invention is in the area of electronic data processing. More particularly, the invention relates to methods, data structures, computer program products and systems for automated processing of invoices.

BACKGROUND OF THE INVENTION

The processing of invoices by means of electronic data records of the invoices is known from the state-of-the-art. Such data records are used in enterprise business software to store the financial data related with a sale of a product, and to have these data available for credit management and risk management purposes. However, although the data are stored in the computer system of the respective company (enterprise), it is not in any case certain, whether the invoice has been actually paid or not or whether a dispute has been opened on the invoice or on the whole sale or on the order process or on contract issues or other problems that will prevent a payment of an invoice. Consequently, if the management of the enterprise analyses the financial situation on the basis of uncertain data of invoices, the result may be misleading and may show that financial situation of the enterprise which is different from the real financial situation. Further, the company may not be aware of the need to collect the cash from active debts, and even if the company is aware, it is not in any case clear, on which part of the outstanding invoices the efforts of cash collecting should be focused. This results particularly in a technical problem, if a large number of invoices, which have been sent to a plurality of customers, have to be processed by the computer system. From the technical point of view, frequent searching of data bases with complex searching conditions have to be made, which stress the system performance or, in other words cause expenditures for computing power and storage capacity.

Thus, there is a need for a method, software application and/or data processing system providing a more efficient solution of at least a part of the problems described above; particularly it is desirable to provide a software application having a mechanism for more efficiently running the computer system and enabling a better processing of invoices.

The above description is based on the knowledge of the present inventors and not necessarily that known in the art.

SUMMARY OF THE INVENTION

In accordance with embodiments of the invention, methods and systems are provided for computerized processing of invoices which a company has presented to two or more customers. In accordance with one embodiment, a method is provided that includes selecting, from a plurality of invoices, invoices which are due within a preselectable time or on a preselectable date and the balance of which is larger than a preselectable first value, and assigning a first state to the selected invoices.

Applying methods, consistent with embodiments of the invention may reduce the expenditures for searching and querying databases and increase system performance, particularly if huge amounts of invoices have to be screened.

Further, the collection of outstanding cash independent of a specific customer is made easier. A company can focus its capacity of cash collection on such invoices, which are considered to be most important with respect to its turnover. The invention allows a company to have an overview over critical invoices duly before the respective due dates, so that measures to ensure punctual payment can be taken in good time. Further, the management of the respective company can get an improved day sales outstanding, a better management of liquidity, an improved credit risk management through more transparency, better customer profiling through company owned credit scores, better accounts receivable reporting and a better communication with customers.

Embodiments of the invention are further directed to computer systems, computer programs, computer readable media and carrier signals, each including program code or instructions for computerized processing of invoices which a company has presented to, for example, two or more customers. Embodiments consistent with the invention are further directed to electronic data structures having one or more data fields for one or more states.

Such computer program can be installed as one or more programs or program modules on different hardware systems (computers or computer systems), and run separately and independently of each other, in their entirety being capable of performing the inventive method and its embodiments. The different systems may be connected in the form of a network to communicate with each other.

Additional objects and advantages of the various embodiments of the invention will be set forth in part in the description, or may be learned by practice of the invention. The objects and advantages of the embodiments of the invention will be realized and attained by means of the elements and combinations particularly pointed out in the appended claims. Embodiments of the invention are disclosed in the detailed description section and in the dependent claims.

The various embodiments can include and/or exclude different aspects, features and/or advantages, where applicable. In addition, various embodiments can combine one or more aspects or features of other embodiments, where applicable.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute a part of this disclosure, illustrate by way of examples various embodiments and aspects of the invention. In the drawings.

DESCRIPTION OF THE EMBODIMENTS

Within the concept of this specification, the terms used shall have their usual meaning in the context of the field of data processing, unless defined otherwise herein.

A computer system broadly refers to any stand alone computer such as a PC or a laptop or a series of computers connected via a network, e.g. a network within a company, or a series of computers connected via the internet.

Computer systems and programs may be closely related. As used herein, phrases, such as "the computer provides" and "the program provides or performs specific actions", "a user performs a specific action" are used to express actions by a computer system that may be controlled by a program or to express that the program or program module may be designed to enable the computer system to perform the specific action or to enable a user to perform the specific action by means of a computer system.

It should be understood that the term "presentment" as used herein broadly refers to the specialized definition normally associated with commercial paper (i.e. the production on a negotiable instrument to a drawee) as well as to providing information via electronic means. For example, this electronic presentment may be through the use of an Internet- or intranet website or via e-mail or SMS, e.g. by making a web site accessible to one or more persons. Electronic presentment may also take place by sending computer readable storage media, like disks, ZIP disks, magneto-optical disks, CDs, R/W discs, DVD ROMs etc., e.g. via standard mail.

Reference will now be made in detail to the principles of the invention and its embodiments by an explanation on the basis of a data processing process, examples of which are illustrated in the accompanying drawings.

In electronic data processing, particularly in accounting processes, the content of invoices may be stored in electronic data records. Such data record may be implemented as one or more lines of one or more tables, each line having one or more fields. In object orientated programming an electronic data record may be implemented by an instance of a class. The class then has at a plurality of variables. The class further has a one or more functions, which are operable on the instances (invoices). The fields or variables contain typical invoice information such as name of customer, addresses, product, price, account no., payment terms, tax, contact person, invoice date, due date or person responsible for changes in the document on the customer side or responsible person for authorization.

The method as described in the summary section may be performed by using such electronic data records. A set of such records may be queried to extract such records, which meet the condition according to which the respective invoices are due within a preselectable time or on a preselectable date and the balance of which invoices is larger than a preselectable first value. Subsequently, a first state is assigned to the thus selected invoices. The assignment may be implemented, for example, by a program module starting automatically at preselectable times or time intervals querying the invoice data and writing states into state fields of the data records according to predefineable conditions. Another example is that a list of such preselected invoices may presented to a user by a graphical user interface and the user may then select states to be assigned to the selected invoices using selections presented to him in the context of the user interface.

An example of a preferred implementation of assigning a state to the invoices is that the electronic data record may comprise a data field for the characterization of the state of the invoice and that characters are entered into that data field for the characterization of the state. This field is hereinafter referred to as state field. The state field may be implemented as a string field with a length of 1 to 3, 4, 5, 6, 7, 8 or more characters, depending on the number of possible states that shall be available. Numerical type or Boolean type fields are possible as well. Following of preferably at least three or four or five or more states may be available for assignment: paid, unpaid, balance>first value, balance<second value, due, undue, for cash collection, special attention, high priority, medium priority, low priority, problem indicators on contract issues or on invoice content and lay-out issues or on issues to be handled by responsible managers or on escalated matters, internal status, number of days outstanding, payment date of document. These states are examples and not intended to limit the scope of the invention.

The thus selected and/or thus assigned invoices may be stored as a separate set or marked as selected.

In a further step it may be controlled, e.g. by the computer system, whether payments have been received for the selected invoices. Invoices, for which no payments or only partial payments have been received, are further extracted, e.g. by storing them separately or marking. Both steps may also be performed in inverted order or as a single query. Invoices having a certain state, e.g. "for cash collection" may be automatically presented to a collecting service. A collecting service may be, for example, a case worker of the company, and the presentation to him may be performed as pointed out above, e.g. by sending an e-mail including a file with the selected set of invoices, or a link pointing to the storage location of such a file or by sending a link to a web page, which contains the selected invoices and which may comprise further information like correspondence, notes, scanned letters etc. The caseworker then can decide what further actions are to the performed. He may, for example, send an e-mail to the customer or call him directly via telephone or the like. After presenting the selected invoices to the collecting service, the states of the invoices may be changed accordingly. It should be noted that the selection is not based on invoices for a specific customer, but it is made customer independent over a plurality of invoices. This allows a customer independent reporting, what results in a better overview over the financial situation of the company. As an example, invoices of high priority may be presented 10 days before their due date, medium priority 7 days before their due date and low priority invoices on the due date. The mentioned values are examples and depend on the intention of the respective company. Instead of priority, the amount of the balance may be used as well.

A first embodiment of the method is characterized in that the method further comprises a step of selecting from said plurality of invoices one or more invoices and assigning a second state to said selected invoices. The assignment of the second state may be implemented by a second data field in the data record analogous to that pointed out above. Alternatively the assignment of two (or more) states may also be implemented by defining a first number of characters of the string in the state field as representing the first state and a second number of characters subsequent to the first number as representing a second state and so forth. For example, if a string in the state field consists of 8 characters "ABCDEFGH", the first two characters (AB) may define the first state, the following 3 characters (CDE) may define a second state, the following two characters (FG) may define a third state and the last character (H) may define a fourth state. Any such combination may be applied, and any meaning can be assigned to any state. This is on the discretion of the user of the method and the computer system.

A second embodiment of the methods comprises said first and second state being represented by a first and second set of characters entered into one data field of a data record comprising data of the respective invoice.

A third embodiment of the methods comprises the one or more invoices being invoices of special importance. Cases of special importance may be, for example, cases, in which non standard business conditions have been agreed upon in the underlying contract, e.g. special payment conditions, special discount, conditions deviating from the standard business conditions of the company, etc.

A fourth embodiment of the methods is characterized in that said first and second states are states of high priority.

A fifth embodiment of the methods is characterized by selecting from said plurality of invoices such invoices, the balance of which is smaller than a preselectable second value, and larger than a preselectable third value and assigning a third state to such selected invoices, the second value being smaller or equal than the first value and the third value being smaller than the second value.

In a sixth embodiment, the methods comprises that the third state is a state of medium priority.

An seventh embodiment of the methods comprises selecting from said plurality of invoices such invoices, the balance of which is smaller than the third value and assigning a fourth state to such selected invoices.

A further embodiment of the methods is characterized in that the fourth state is a state of low priority.

In a further embodiment of the methods, the preselectable first value is such that a preselectable percentage of the outstanding active debts or turnover of the company is controlled.

A further embodiment of the methods comprises presenting the invoices of the first and/or second and/or third and/or fourth state to a cash collector.

A still further embodiment of the methods is characterized in that presenting the invoices having a first or second state at the latest at a presetable first period of time before the due date to the cash collector.

A still further embodiment of the methods is characterized by presenting the invoices having a third state at the latest at a presetable second period of time before the due date to the cash collector.

A still further embodiment of the methods is characterized by presenting the invoices having the fourth state at the latest at a presetable third period of time before the due date to the cash collector.

A still further embodiment of the methods is characterized by said cash collector controlling, whether payments according to the invoices of the first and/or second state have been made before or on or after the due date, and in case of a non payment, presenting such invoices to a collecting service.

A still further embodiment of the methods is characterized in that the second period of time is smaller than the first period of time and the third period of time is smaller than the second period of time.

A still further embodiment of the methods comprises dunning the customers of the accompanying due invoices.

In a still further embodiment of the methods the collection service is a collection division of the company or an external collecting agency.

A still further embodiment of the methods is characterized by checking whether a non-payment is reasoned, and in case no, presenting such invoice to an external collecting agency.

A still further embodiment of the methods is characterized by presenting the selected invoices to the collecting service by means of a to-do-list.

A still further embodiment of the methods comprises receiving a request for a state change of an invoice from a customer and changing the state of the invoice according to said request.

A still further embodiment of the methods comprises presenting the request to an internal clearing division before changing the state.

A still further embodiment of the methods is characterized in that the method further comprises: selecting from the selected invoices such invoices, the due date of which has expired (step a), controlling, whether a payment regarding the respective invoice has been received before or on the time of selection (step b) and presenting the selected invoices to a collecting service (step c).

An embodiment of this method comprises instead or in addition to step a): d) selecting from said plurality of invoices such invoices, the balance of which is smaller than a preselectable second value, and larger than a preselectable third value, the second value being smaller or equal than the first value and the third value being smaller than the second value, before continuing with step b).

A further embodiment comprises in step d): selecting from the selected invoices such invoices, which are due within a preselectable time or on a preselectable date. This is useful, because it enables a company to efficiently check, whether its invoices are paid in due time. For example: the collecting service (case worker) receives a list of invoices, which are due in two days. The case worker can now schedule his time, because he knows how many and what invoices he has to check on payment in two days.

A further embodiment is characterized by instead or in addition to step c): dunning the customers of the accompanying unselected due invoices. With this method, minor important invoices can be automatically processed, e.g. by automatically sending personalized circular letters or mails.

A further embodiment is characterized by in step c): presenting the selected invoices via a to-do-list. Within the concept of this disclosure, the presentation of a to-do-list may be accomplished by presenting the selected invoices in the form of a list on a display of the computer system of a caseworker. This can be done automatically or by sending a link to the file, which contains the list. The list may be provided with checkboxes, alerts, or proposals for actions, each depending on the state of the respective invoice.

In a further embodiment, the methods are characterized in that the preselectable first value is such that a preselectable first percentage of the outstanding active debts or turnover of the company is covered. The first percentage may range for example from 90 to 70%, depending on the intention of the company. For example, 80% may be a useful value in a variety of cases. The actual number of the first value can, for example, be determined iteratively by successively increasing the first value from start value (zero is the trivial case) and checking within each step, which percentage of the turnover is covered, and taking that number as first value, the accompanying percentage of which equals the desired value of turnover.

A further embodiment of methods consistent with the present invention is characterized in that the preselectable first, second and third values are such that a preselectable second percentage of the outstanding active debts or turnover of the company is covered. The second percentage may, for example, range from 70 or 80 or 90 to 100%, including all interim values, depending on the intention of the company. The selection according to this embodiment may help ensure that unselected invoices represent only a comparatively small percentage (100−second percentage) of the company's turnover.

Another embodiment comprises in step c): checking, whether a partial- or non-payment is reasoned, and in case no, presenting such unreasoned partial- or non-paid invoice to a collecting agency. Within the concept of this disclosure, the term "collecting agency" broadly refers to collection divisions of the company as well as to collecting agencies different from the company. After presenting the invoices to the collecting agency, the states of the respective invoices may be changed accordingly.

A further embodiment of the inventive method comprises in step c): presenting not due invoices at the latest at a presetable first period of time before the due date to the collecting service.

A further embodiment of the inventive method comprises in step d): presenting not due invoices at the latest at a presetable second period of time before the due date to the collecting service.

A still further embodiment of the inventive method comprises instead or in addition to step a) and/or d): selecting from said plurality of invoices such invoices, the balance of which is smaller than the third value.

A still further embodiment comprises in step d): presenting the invoices at the latest at a presetable third period of time before the due date to the collecting service.

A still further embodiment comprises said collecting service controlling, whether payments according to the invoices have been made before or on or after the due date, and, in case of a partial- or non payment, presenting such invoices to a collecting agency.

A still further embodiment comprises checking whether a partial- or non-payment is reasoned, and in case no, presenting such invoice to an external collecting agency.

A still further embodiment comprises presenting such invoices to a clearing division prior to presenting to the external collecting agency. This is useful, because it enables the company to negotiate new payment conditions with the customers before escalating the case to the collecting agency. In case new payment conditions have been agreed upon, the step of presenting to the collecting agency can be omitted.

The preselectable first, second and third values, times, dates and percentages can be stored in variables or tables and can be made editable through a user, e.g. a case worker of a collecting service.

A still further embodiment of the inventive method is characterized in that the second period of time is smaller than the first period of time and the third period of time is smaller than the second period of time. In a still further embodiment the collection agency is a collection division of the company or an external collecting agency.

A first embodiment of the electronic data record is characterized in that said state field contains one or more sets of characters for the characterization of one or more states. An alternative embodiment is characterized in that the data record comprises one or more state fields for the one or more states. The above mentioned states may be entered into the state field(s) by entering a characteristic character or combination of a few characters into the field(s), e.g. S1 to Sn for a number of n states. To each condition mentioned above, a state can be assigned and entered into the state field. Likewise, a state can be assigned to combinations of two or more conditions.

A further embodiment of the electronic data record is characterized in that said state field(s) is (are) linked to one or more tables, which contains a description of a state. For example, the following descriptions can be entered in that table: balance>=X, X>balance>=Y, high priority, special case, high priority AND balance>=X, due within U days, due on "date", etc.

A further embodiment of the electronic data record is characterized in that the state field is directly or indirectly linked to a table, which contains one or more instructions, which depend on said state and which are automatically executable by a computer system, for example instructions for automatically dunning customers.

A further embodiment of the electronic data record is characterized in that said state field is directly or indirectly linked to a table, which contains assignment of a state to an event, which might occur during the processing of the invoice. The following events may be typically contained: Invoice blocked for payment, because of invoice lay-out not complete or incomplete invoice reference or quality or quantity issues on outstanding documents to be solved by responsible person within company. These events are examples and are not intended to limit the scope of this invention. By means of a table one or more proposals for a change of the state may be assigned to a state.

In a further embodiment, the electronic data record comprises a field for comments. This field may be implemented for example as a string field of a length of up to 128 characters or more.

A further embodiment of the electronic data record is characterized in that the electronic data record is at least partially accessible via the internet and wherein the content of the state field or a data field for comments is editable via the internet. In order to achieve this, the respective data fields must be deblocked for read/write access in the computer system in which the electronic data record is processed. Other selected fields of the electronic data record, the content of which fields may be of interest for a potential internet user, may be deblocked for read access only.

A further embodiment of the electronic data record is characterized in that the state field is linked to a table, which contains one or more state dependent proposals for changing the state. For example, if the state is that an invoice has to be paid in a few days, a proposed state after the due date is that the state may be changed in "not paid". Or if certain situation has been clarified by a phone call, the sate it may have the state "will be paid with delay".

A further embodiment of the method as described in the summary section and using the data structure described above is characterized in that the method further comprises a step of assigning a state, which may be entered by a user, to said state field. This may be implemented by an independent program, which may collect all changes of states in a predefineable time interval and which writes the changes periodically into the respective state fields.

A further embodiment of this method is characterized in that the method further comprises selecting or sorting or evaluating or analyzing the electronic invoices according to the state.

By using this method and general known data base query tools, a user of the method—e.g. a collecting service—may get lists of all invoices, which fulfill predefineable conditions with respect to the state field as pointed out above.

A further embodiment comprises calling a state dependent work flow.

By using this method, a workflow, which is designed to solve a specific problem, may be automatically initiated. For example, a dispute process can be initiated if a due invoice is not paid without a reasoned statement. Then a mail may be automatically sent to collecting agency in order to solve the problem. Further, a deadline can be issued on an outstanding problem. After experiment date the system may automatically sent a reminder to the responsible persons to take action.

Further, the to-do-list can be initiated for cash collectors on outstanding items, by sending a mail to responsible contact persons for the customers.

A still further embodiment is the disclosed method(s) or data structures or computer system(s) for use in or for an enterprise resource planning software. An enterprise resource planning software herein broadly refers to any software or software package for supporting business processes of enterprises, including but not limited to accounting, administration, management, or production processes.

Processors suitable for the execution of a computer program for performing the above methods include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices (storage means) for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

The invention is now described in more detail by way of reference to the drawings.

Figure 1:
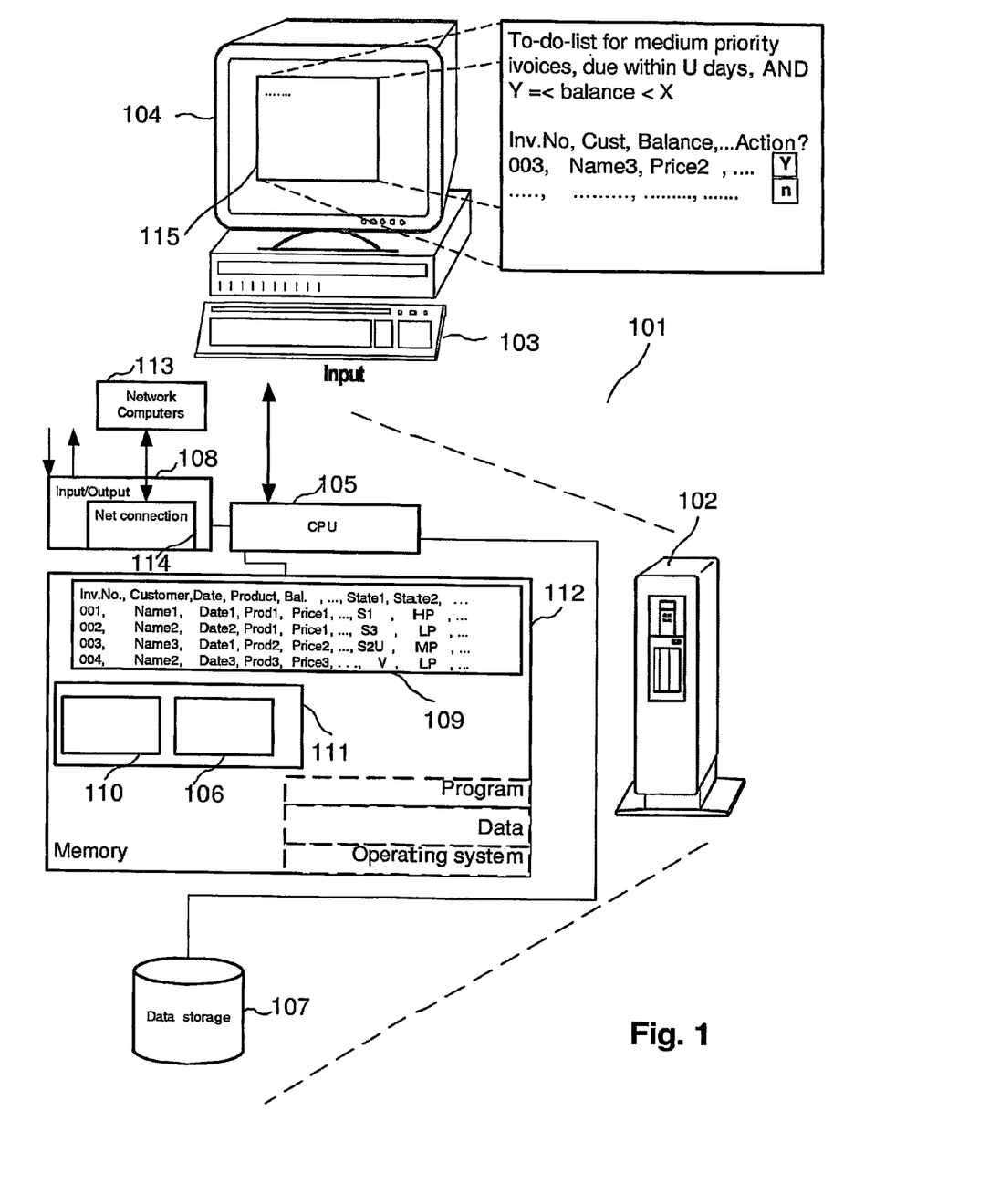
FIG. 1 is an exemplary diagram for illustrating the implementation of the claimed method by means of a computer system.

FIG. 1 shows one example of an implementation of an embodiment of the invention: A computer system with program modules for processing the inventive electronic data record and for performing the inventive method. What is shown is a computer system 101 comprising a computer 102 having a CPU 105, a memory 112 for storing an operating system, data and programs. In memory 112 a software application 111 is stored for being processed by CPU 105. Software application 111 comprises program modules 106, 110 for carrying out the processing of the inventive electronic data record and the processing according to the inventive method. The inventive electronic data records are implemented in a table 109 comprising columns for typical invoice data and two columns, "state1" and "state2" for two types of states of the invoice. State1 represents a general type, state2 a priority type. Table 109 is stored in computer memory 112 and on a non volatile data storage device 107. Computer System 101 further comprises input means 103, output means 104 for interaction with a user, e.g. for starting the program modules and/or for data input, and general input/output means 108, including a net connection 114, for sending and receiving data. A plurality of computer systems 101 can be connected via the net connection 114 in the form of a network 113. In this case the network computers 113 can be used as further input/output means, including the use as further storage locations. Computer system 101 further comprises storage means 107.

In case the ERP software 111 carries out the claimed method, program modules 106, 110 are processed by CPU 105. The processing comprises module 106 querying table 109 for invoices, which are due within U days and the balance of which is equal or greater than X. Module 106 enters a state, e.g. S1U, into the state field of the respective invoice(s), inv. 003 in the example. Module 106 further queries table 109 for invoices, which meet further predefineable conditions, and enters corresponding states into the state fields. Examples are: state S1 for "balance>=X" and S2 for "X>balance>=Y". Module 106 further assigns a further state, a priority type state "MP" (medium priority) to invoice 003. This may be performed by presenting a corresponding input request to a user, e.g. by means of a graphical user interface. The user then decides what priority the corresponding invoice shall have. The user enters the state (e.g. by clicking a corresponding box) and module 106 writes the state into the state field. Default values may be set for the states when creating the data record for an invoice. Priority states may also be set automatically, e.g. by automatically assigning a low priority state to all invoices, the balance of which is smaller than a preselectable value, or a high priority state to all invoices, the balance of which is greater or equal than a preselectable first value, or to which special contractual conditions apply. Module 106 may also query table 109 for such invoices, which are due on a preselectable date or within a preselectable date and to which a first state is assigned, and assign a second state to such selected invoices. For example, module 106 queries table 109 for invoices, which are due within V days, checks, whether the state1 field for that invoices is other than default an assigns a second state to such invoices as pointed out above. Alternatively this may also be implemented by checking, whether a state "V" (or "U") is contained in the state1 field, and by assigning a second state to such invoices as pointed out above. E.g. all invoices, which are due in V=6 months, shall "now" (at the time of selection) have the state "low priority".

Subsequently or parallel to that procedure, module 110 queries table 109 for medium priority invoices having the state S2U, extracts preselectable data from the respective invoices and presents the extracted date to a user in the form of a to-do-list 115 on a display 104. A user can evaluate the list and can decide whether, and in case yes, what actions should be performed next. In order to support this, the to-do-list may comprise check boxes or buttons by means of which further actions can be initiated. For example a button assigned to each invoice may cause—if it is applied—that a list of possible actions is presented to the user for selection. E.g. that an e-mail with a predefineable content is sent to the customer of the respective invoice. Presenting the to-do-list can also be performed on other network computers 113.

Figure 2:
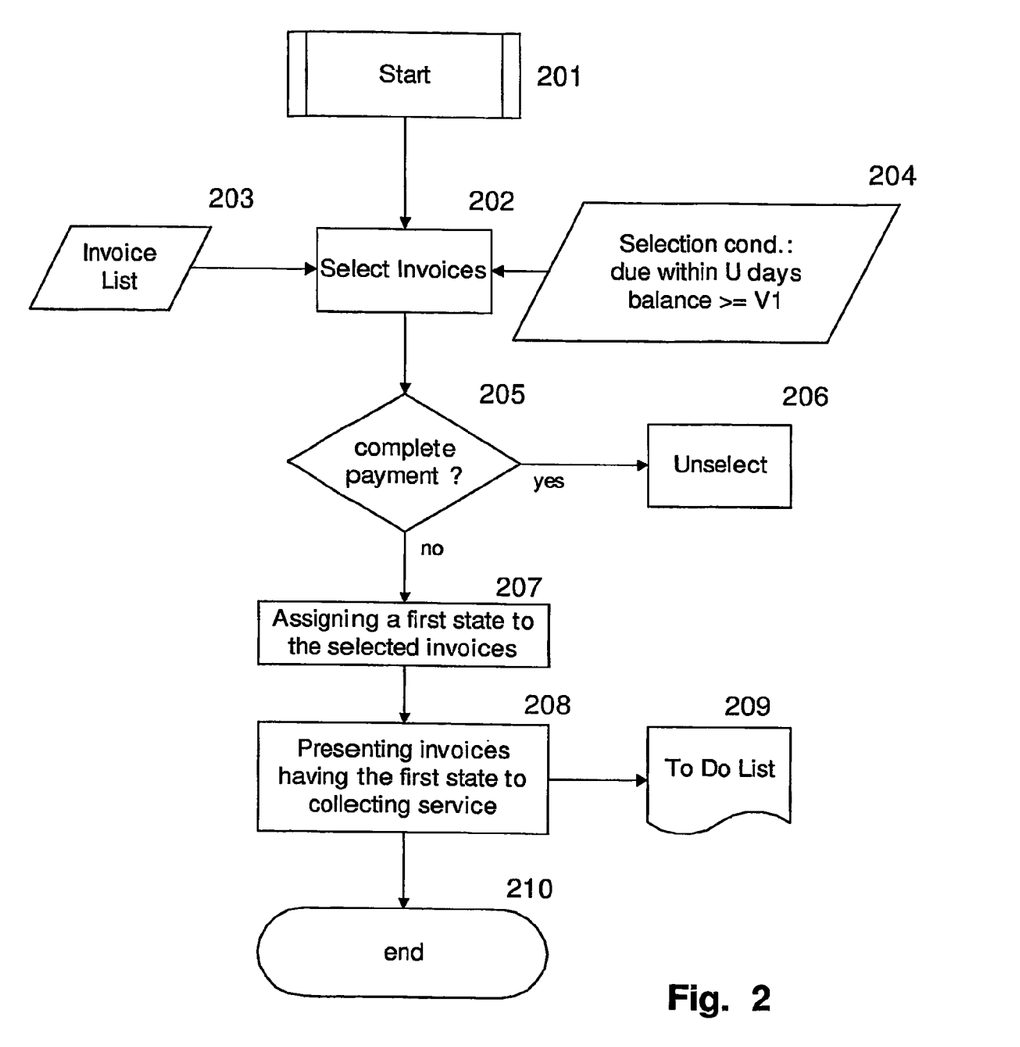
FIG. 2 is an exemplary flow diagram of a first example illustrating a method for processing invoices according to the principles described in this disclosure.

FIG. 2 shows an exemplary flow diagram in order to illustrate principles of the claimed method, particularly an example of a process 106 of FIG. 1. After a start step 201 a list 203 of invoices is queried in a step 202 according to a set of selection conditions 204. In the example, the set consists of only one condition: The balance of an invoice has to be greater than a value V1. For the thus selected invoices it is checked in an optional step 205 whether a full payment has been received. In case yes, the respective invoice is withdrawn from the list of selected invoices in step 206. In a further step, the state of the respective invoice may be changed to "paid". In a step 207, a first state is assigned to invoices, for which none or only a partial payment has been received. Invoices having a preselectable first state, are then presented as a to-do-list 209 in a step 208 to a collecting service, e.g. a user in a collecting department of the company in step 207. The exemplary process then ends in step 210.

Figure 3:
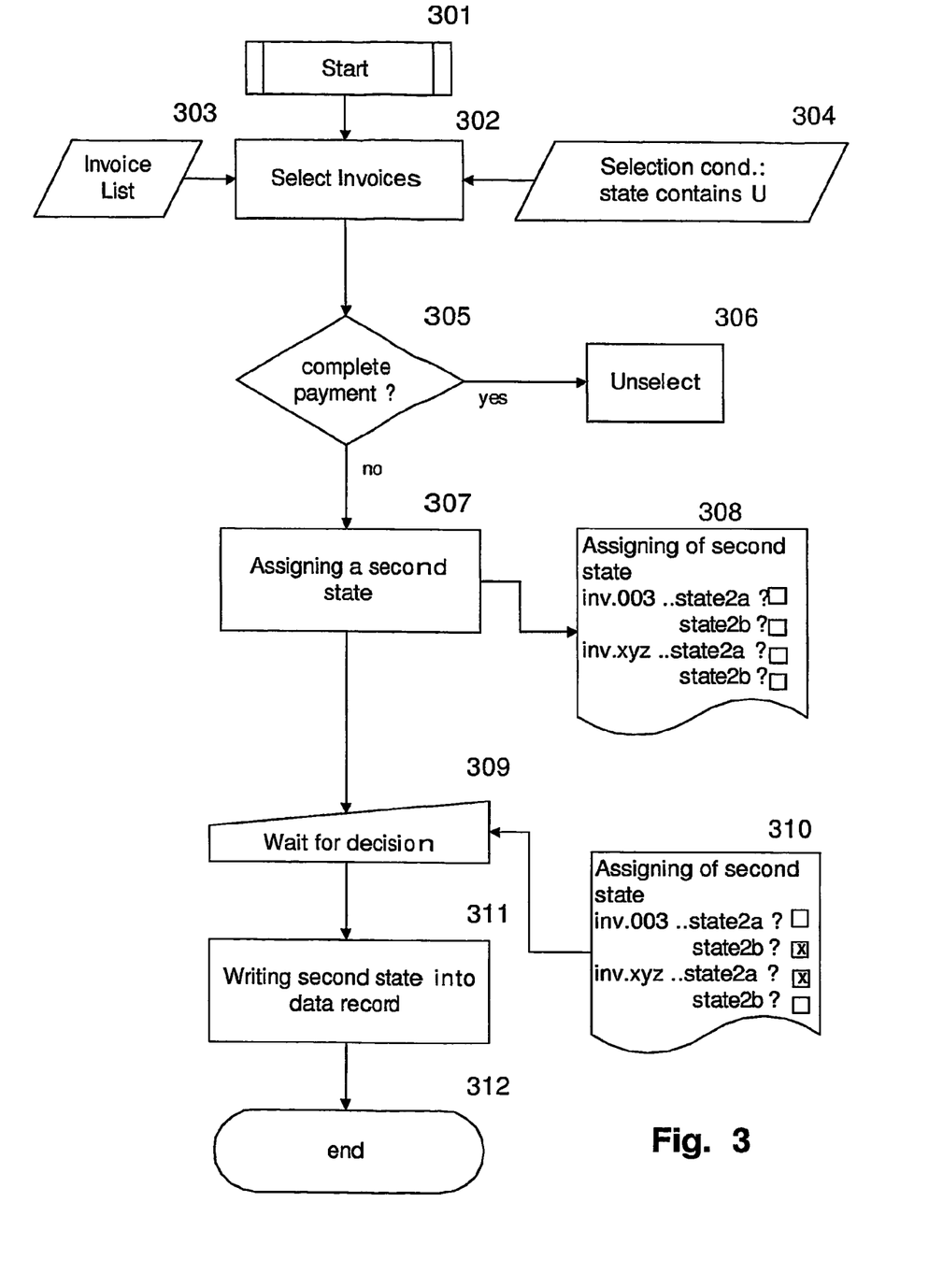
FIG. 3 is an exemplary flow diagram of a second example illustrating a method for processing invoices according to the principles described in this disclosure.

FIG. 3 shows an exemplary flow diagram in order to illustrate principles of the claimed method, particularly an example of a process 106 of FIG. 1. After a start step 301 a list 303 of invoices is queried in a step 302 according to a set of selection conditions 304. In the example, the set consists of only one condition: A state of an invoice has to contain "U", what means: the invoice is due within U days. For the thus selected invoices it is checked in an optional step 305 whether a full payment has been received. In case yes, the respective invoice is withdrawn from the list of selected invoices in step 306. In a further step, the state of the respective invoice may be changed to "paid". In step2 307, 309, 311, a second state is assigned to invoices, for which none or only a partial payment has been received. For this purpose, a list 308 showing the selected invoices is presented to the user. The list 308 comprises information on the invoice and to each invoice means for selecting a state to the invoice. In the example, the user can chose whether the invoices 003 and xyz shall have the state "state2*a*" or "state2*b*". The user clicks the corresponding boxes, while the process is waiting in step 309 for the decision. When the user has finished the selection, the process writes the selected states into the state fields of the data records instep 311. The exemplary process then ends in step 312.

Figure 4:
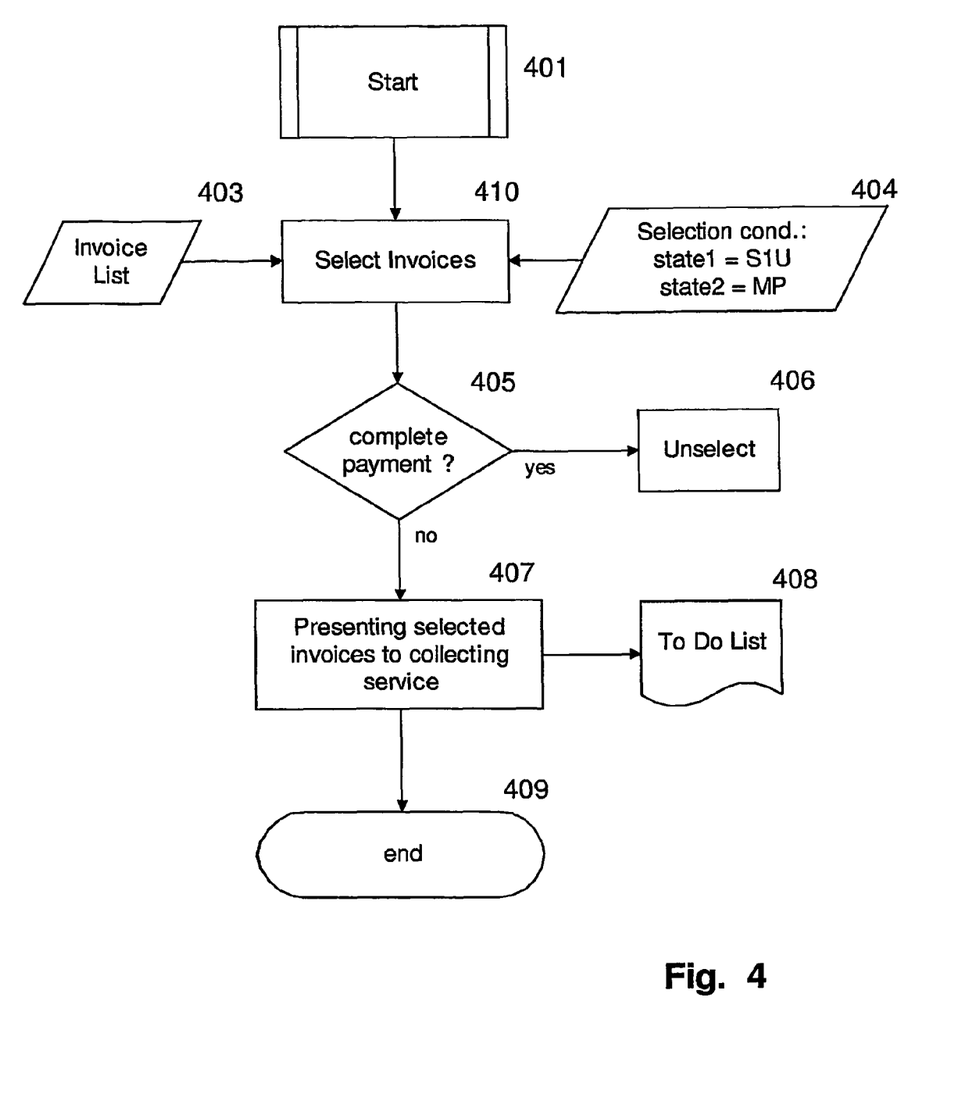
FIG. 4 is an exemplary flow diagram of a third example illustrating a method for processing invoices according to the principles described in this disclosure.

FIG. 4 shows an exemplary flow diagram in order to illustrate principles of the claimed method, particularly an example of a process 109 of FIG. 1. After a start step 401 a list 403 of invoices is queried in a step 402 according to a set of selection conditions 404. In the example, the set consists of two conditions: The first state of an invoice has to be "S1U" and the second state "MP". For the thus selected invoices it is checked in an optional step 405 whether a full payment has been received. In case yes, the respective invoice is withdrawn from the list of selected invoices in step 406. In a further step, the state of the respective invoice may be changed to "paid". In a step 407, invoices having the preselectable first and second state, are then presented as a to-do-list 408 to a collecting service, e.g. a user in a collecting department of the company. The exemplary process then ends in step 409. The user in the collecting department may then initiate actions with regard to each specific invoice, e.g. call the customer by phone or send an email. In case the reaction of the customer on the action satisfies the expectations of the user, this can be entered into the data record by a corresponding state. If no or a dissatisfactory reaction is received from the customer within a preselectable time, a further to-do-list may be presented to the collecting division. The further to-do-list may comprise a list of possible actions, depending on the type of reaction the customer provided, for selection. For example, an invoice may be passed to a credit control area in case financial challenges like bankruptcy of the customer occur, it may be re-routed to a front office, if commercial challenges like dissatisfaction of the customer with delivered goods occurs, it may be re-routed to a back office if invoicing challenges like wrong address or delivery challenges like incomplete delivery occur.

Figure 5:
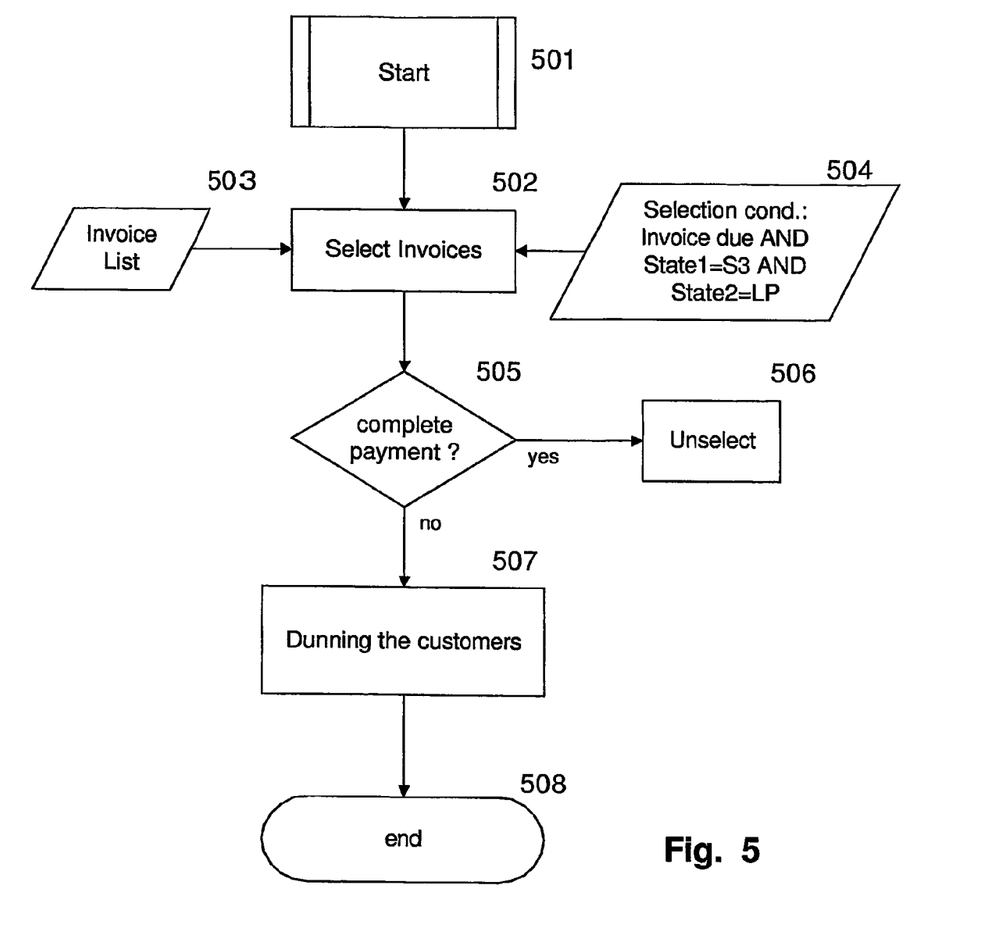
FIG. 5 is an exemplary flow diagram of a fourth example illustrating a method for processing invoices according to the principles described in this disclosure.

FIG. 5 shows a further exemplary flow diagram in order to further illustrate principles of the claimed method, particularly an example of a process 109 of FIG. 1. After a start step 501 a list 503 of invoices is queried in a step 502 according to a set of selection conditions 504. In the example, the set consists of three conditions: the first state is S3 (balance of an invoice has to be smaller than a value Y (see FIG. 7), the invoice has to be due and the second state is low priority. For the thus selected invoices it is checked in an optional step 505 whether a full payment has been received. In case yes, the respective invoice is withdrawn from the list of selected invoices. In a further step, the state of the respective invoice may be changed to "paid". The customers accompanying the invoices, for which none or only a partial payment has been received, are then automatically dunned in step 507, e.g. by automatically sending dunning letters or dunning e-mails. The exemplary process ends in step 508.

Alternatively, the unsettled invoices may be presented as a to-do-list like 209 in FIG. 2 to a collecting service, e.g. a user in a collecting department of the company in order to confirm the dunning by the collecting service before the dunning letter or e-mail is sent out. If no reaction is received from the dunned customer within a preselectable time, the respective invoices may be presented to a collecting agency. In case a reaction is received from the customer, a further to-do-list may be presented to the collecting division. The further to-do-list may comprise a list of possible actions, depending on the type of reaction the customer provided, for selection. For example, an invoice may be passed to a credit control area in case financial challenges like bankruptcy of the customer occur, it may be re-routed to a front office, if commercial challenges like dissatisfaction of the customer with delivered goods occurs, it may be re-routed to a back office if invoicing challenges like wrong address or delivery challenges like incomplete delivery occur.

Figure 6:
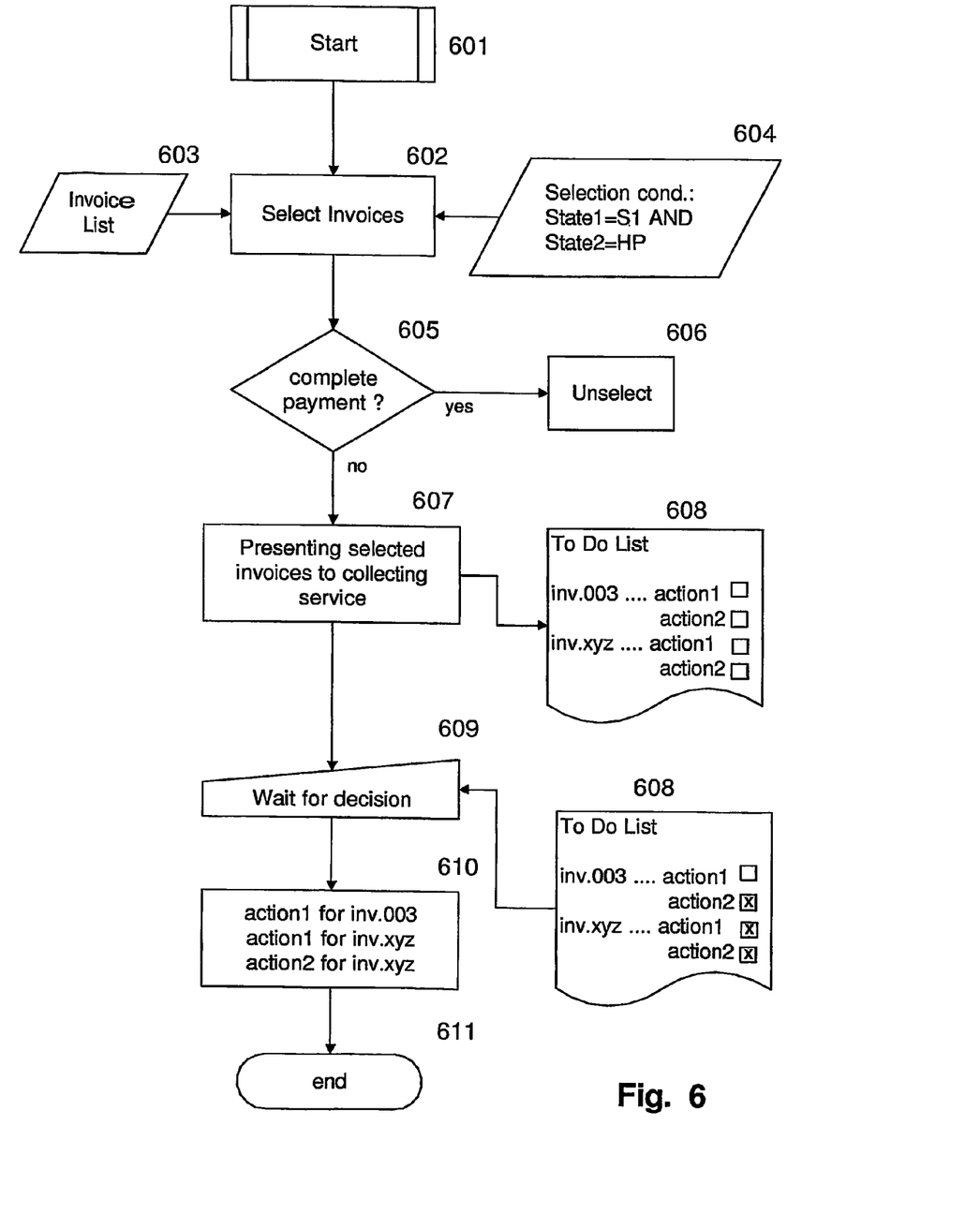
FIG. 6 is an exemplary flow diagram of a fifth example illustrating a method for processing invoices according to the principles described in this disclosure.

FIG. 6 shows a further exemplary flow diagram in order to further illustrate principles of the claimed method, particularly an example of a process 109 of FIG. 1.

After initiating the process in a start step 601 a list 603 of invoices is queried in a step 602 according to a set of selection conditions 604. In the example, the set consists of two conditions: the first state field has to contain S1 (balance of an invoice has to be greater than a value V1, see FIG. 7) and the second state has to be a high priority. For the thus selected invoices it is checked in an optional step 605 whether a full payment has been received. In case yes, the respective invoice is withdrawn from the list of selected invoices in step 606. In a further step, the state of the respective invoice may be changed to "paid". The invoices, for which none or only a partial payment has been received, are then presented as a to-do-list 608 to a collecting service, e.g. a user in a collecting department of the company in step 607. The user then can decide what action has to taken next, e.g. by selecting one of a list of proposed actions, which is incorporated into the to-do-list 608. The process waits for that decision in step 609.

The selected action is then automatically carried out in step 610. An example for such an action is: presenting the invoice to an in-house clearing division for deciding whether presenting it to an external collecting agency or not. The exemplary process then ends in step 611.

The optional steps for checking whether payments have been received, can also be performed before starting the respective processes, e.g. when creating the invoice lists 203 to 603.

Figure 7:
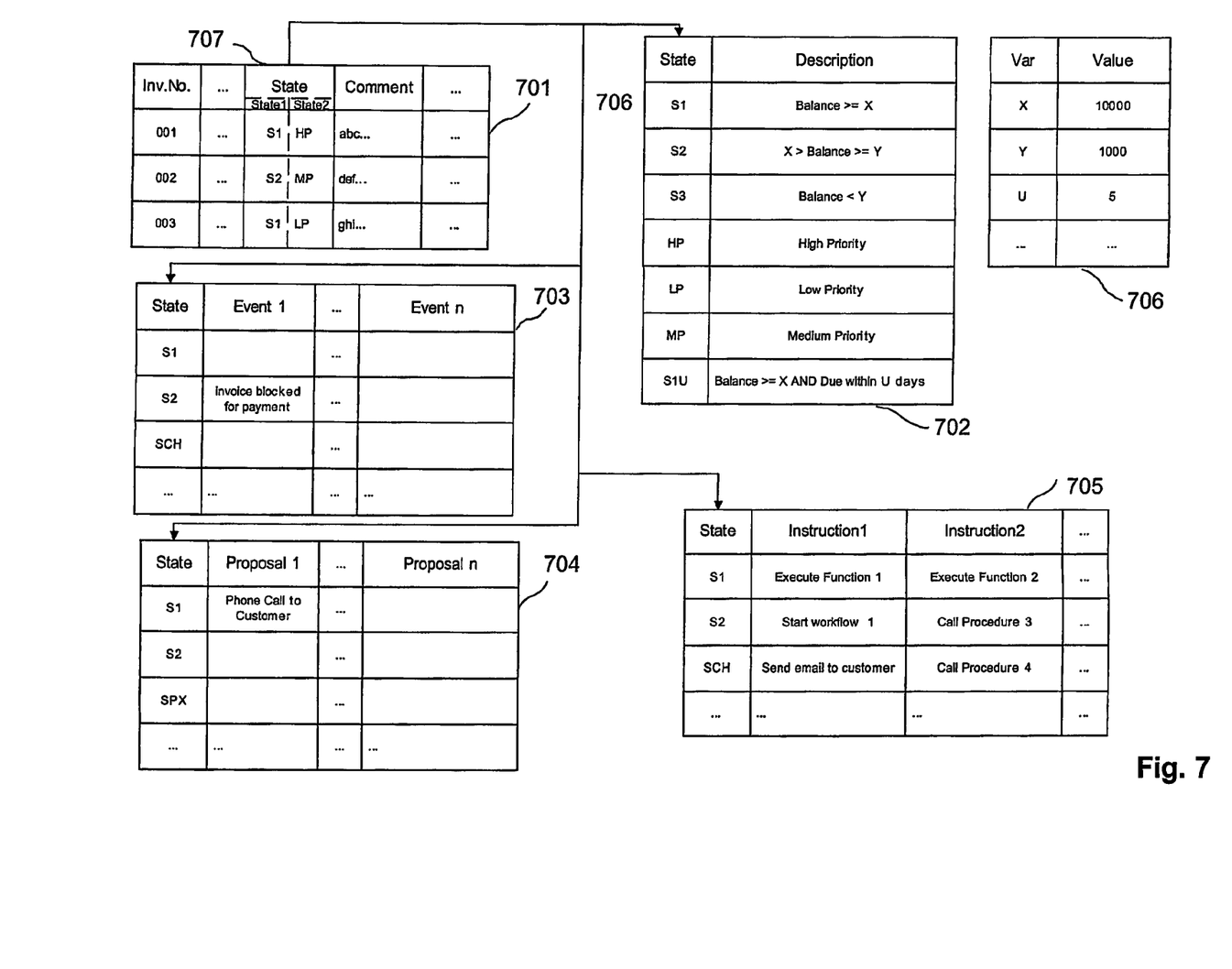
FIG. 7 is an exemplary block diagram for illustrating an exemplary data structure for processing invoices according to the principles described in this disclosure.

FIG. 7 shows an example of a data structure of an invoice for the purposes of illustration. In the example of FIG. 7, the data structure is implemented as a table 701 having a plurality of columns. According to an embodiment of the invention, a column 707 for the first and second date of the invoice is contained. The fields of the column 707 contain strings of a length of at least four characters. The first two characters are defined to represent the first state, the second two characters represent the second state. Further, groups of characters may be used to define further states, depending on the length of the field. Depending on the number of states, one character per state may be sufficient. Alternatively n columns for n states can be used as well. Combinations of both alternative are also possible. The individual data records of the invoices are implemented as individual lines of table 701. The state column 707 of table 701 comprises one state field for each invoice. In a table 702, a description is assigned to a state. By means of table 703, one or more events 1 to n are assigned to a state. By means of table 704, one or more proposals 1 to n are assigned to a state. By means of table 705, one or more events 1 to n are assigned to a state. Tables 702 to 705 are linked to table 701 by the state column. In a table 706, values of variables may be stored. The conditions, which are applied when querying the list of invoices, may be stored in a table as well.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing invoices, the method being performed by a computer and comprising:
    selecting, from a plurality of invoices, by the computer, a first set of invoices which are due within a specified time period and which have a balance larger than a first threshold value;
    selecting, by the computer, from the first set of invoices, a second set of invoices for which a full payment of the respective balance has not been received;
    associating, by the computer, a plurality of optional states with a selected invoice in the second set of invoices;
    presenting the selected invoice with the plurality of optional states;
    receiving a selection of a first state, among the plurality of optional states, for the selected invoice;
    using the first state to control processing of the selected invoice;
    selecting, from said plurality of invoices, a fourth set of invoices having balances smaller than a second threshold value and larger than a third threshold value;
    assigning a third state to the fourth set of invoices, the second threshold value being smaller than or equal to the first threshold value and the third threshold value being smaller than the second threshold value;
    selecting, from said plurality of invoices, a fifth set of invoices having balances smaller than the third threshold value;
    assigning a fourth state to the fifth set of invoices; and
    presenting invoices having at least one of the first state, the second state, the third state, and the fourth state to a cash collector,
    wherein invoices having at least one of the first state or the second state are presented to the cash collector at the expiration of a first period of time before the due dates of the presented invoices.

2. The method of claim 1, further comprising:
    selecting, from the plurality of invoices, a third set of invoices; and
    assigning a second state to the third set of invoices.

3. The method of claim 2, comprising storing at least one of the first state and the second state as an entry into data fields of data records, the data records comprising data of the third set of invoices.

4. The method of claim 2, comprising:
storing at least one of the first and the second state as a first and second set of characters entered into one data field of a data record comprising data of the respective third set of invoices.

5. The method of claim 1, wherein one or more of the plurality of invoices are invoices of special importance.

6. The method of claim 2, wherein said first state and second state are states of high priority.

7. The method of claim 1, wherein the third state is a state of medium priority.

8. The method of claim 1, wherein the fourth state is a state of low priority.

9. The method of claim 1, wherein the first threshold value is selected such that a total balance of the first set of invoices is equal to a specified percentage of the outstanding active debts of a company that issues the invoices.

10. The method of claim 1, further comprising presenting the invoices having the third state to the cash collector at the expiration of a second period of time before the due dates of the presented invoices.

11. The method of claim 1, further comprising presenting the invoices having the fourth state to the cash collector at the expiration of a third period of time before the due dates of the presented invoices.

12. The method of claim 1, further comprising:
determining, by said cash collector, whether payments to the invoices having at least one of the first state and the second state have been made before, on, or after the due date; and,
for invoices associated with a non-payment, presenting the non-payment invoices to a collecting service.

13. The method of claim 11, wherein the second period of time is smaller than the first period of time and the third period of time is smaller than the second period of time.

14. The method of claim 1, further comprising dunning customers associated with the fifth set of invoices.

15. The method of claim 12, further comprising presenting the non-payment invoices to one of a collection division of a company that issues the invoices or an external collecting agency.

16. The method of claim 12, further comprising:
checking whether a non-payment is reasoned; and
in case the non-payment is not reasoned, presenting such non-payment invoice to an external collecting agency.

17. The method of claim 12, further comprising presenting the non-payment invoices to the collecting service as a to-do-list.

18. The method of claim 1, further comprising:
receiving a request for a state change of a specified invoice from a customer; and
changing a state of the specified invoice according to said request.

19. The method of claim 18, further comprising presenting the request to an internal clearing division before changing the state.

20. The method of claim 1, wherein the method is implemented as part of software for supporting business processes, the software comprising enterprise resource planning software.

21. A computer system for processing invoices, comprising:
a memory having program instructions;
an input device for receiving and entering data;
a display device for displaying content;
a storage component for storing data; and
a processor configured to execute the program instructions to:
select, from a plurality of invoices, a first set of invoices which are due within a specified time period and which have a balance larger than a first threshold value;
select, from the first set of invoices, a second set of invoices for which a full payment of the respective balance has not been received;
associate, by the computer, a plurality of optional states with a selected invoice in the second set of invoices;
present the selected invoice with the plurality of optional states;
receive a selection of a first state, among the plurality of optional states, for the selected invoice;
use the first state to control processing of the selected invoice;
select, from said plurality of invoices, a fourth set of invoices having balances smaller than a second threshold value and larger than a third threshold value;
assign a third state to the fourth set of invoices, the second threshold value being smaller than or equal to the first threshold value and the third threshold value being smaller than the second threshold value;
select, from said plurality of invoices, a fifth set of invoices having balances smaller than the third threshold value;
assign a fourth state to the fifth set of invoices; and
present invoices having at least one of the first state, the second state, the third state, and the fourth state to a cash collector,
wherein invoices having at least one of the first state or the second state are presented to the cash collector at the expiration of a first period of time before the due dates of the presented invoices.

22. A non-transitory computer-readable storage-medium storing a computer program which, when executed by a processor, causes processor to perform a method for processing invoices, the method comprising:
selecting, from a plurality of invoices, a first set of invoices which are due within a specified time period and which have a balance larger than a first threshold value;
selecting, from the first set of invoices, a second set of invoices for which a full payment of the respective balance has not been received;
associating, by the computer, a plurality of optional states with a selected invoice in the second set of invoices;
presenting the selected invoice with the plurality of optional states;
receiving a selection of a first state, among the plurality of optional states, for the selected invoice;
using the first state to control processing of the selected invoice;
selecting, from said plurality of invoices, a fourth set of invoices having balances smaller than a second threshold value and larger than a third threshold value;
assigning a third state to the fourth set of invoices, the second threshold value being smaller than or equal to the first threshold value and the third threshold value being smaller than the second threshold value;

selecting, from said plurality of invoices, a fifth set of invoices having balances smaller than the third threshold value;
assigning a fourth state to the fifth set of invoices; and
presenting invoices having at least one of the first state, the second state, the third state, and the fourth state to a cash collector,
wherein invoices having at least one of the first state or the second state are presented to the cash collector at the expiration of a first period of time before the due dates of the presented invoices.

* * * * *